US012458885B2

(12) United States Patent
Dong et al.

(10) Patent No.: US 12,458,885 B2
(45) Date of Patent: Nov. 4, 2025

(54) VIRTUAL CHARACTER SELECTION METHOD AND APPARATUS, TERMINAL, AND STORAGE MEDIUM

(71) Applicant: TENCENT TECHNOLOGY (SHENZHEN) COMPANY LIMITED, Guangdong (CN)

(72) Inventors: Zexian Dong, Shenzhen (CN); Wanna Jin, Shenzhen (CN); Hang Li, Shenzhen (CN); Xin Chen, Shenzhen (CN); Jinle Fang, Shenzhen (CN); Yi Wang, Shenzhen (CN); Kun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 318 days.

(21) Appl. No.: 18/297,739

(22) Filed: Apr. 10, 2023

(65) Prior Publication Data

US 2023/0241500 A1 Aug. 3, 2023

Related U.S. Application Data

(63) Continuation of application No. PCT/CN2022/104931, filed on Jul. 11, 2022.

(30) Foreign Application Priority Data

Aug. 12, 2021 (CN) ......................... 202110926977.6

(51) Int. Cl.
*A63F 13/533* (2014.01)
*A63F 13/5372* (2014.01)
(Continued)

(52) U.S. Cl.
CPC ........ *A63F 13/533* (2014.09); *A63F 13/5372* (2014.09); *A63F 13/69* (2014.09); *A63F 13/75* (2014.09); *A63F 13/833* (2014.09)

(58) Field of Classification Search
CPC .... A63F 13/533; A63F 13/5372; A63F 13/69; A63F 13/75; A63F 13/833
See application file for complete search history.

(56) References Cited

U.S. PATENT DOCUMENTS

2017/0235462 A1 8/2017 Zhou

FOREIGN PATENT DOCUMENTS

CN 106919790 A 7/2017
CN 107930129 A 4/2018
(Continued)

OTHER PUBLICATIONS

Super Street Fighter II: Turbo—Original Color Glitch, https://www.youtube.com/watch?v=tLrMYdLXGzs. (Year: 2014).*
(Continued)

*Primary Examiner* — Reginald A Renwick
(74) *Attorney, Agent, or Firm* — Sughrue Mion, PLLC

(57) ABSTRACT

A virtual character selection method and apparatus, a terminal, and a storage medium, relating to the field of computer and Internet technologies. The method includes: displaying a character selection interface of a competitive battle, displaying a remaining duration of a character selection phase in a character selection interface, and displaying character information of a first virtual character selected by a system for a first user in the character selection based on the remaining duration meeting a first condition and the first user not selecting the virtual character.

18 Claims, 7 Drawing Sheets

(51) Int. Cl.

| | |
|---|---|
| ***A63F 13/69*** | (2014.01) |
| ***A63F 13/75*** | (2014.01) |
| ***A63F 13/833*** | (2014.01) |

(56) References Cited

FOREIGN PATENT DOCUMENTS

| | | | |
|---|---|---|---|
| CN | 108553904 | A | 9/2018 |
| CN | 108771867 | A | 11/2018 |
| CN | 111265869 | A | 6/2020 |
| CN | 111760295 | A | 10/2020 |
| CN | 111773656 | A | 10/2020 |
| CN | 112044058 | A | 12/2020 |
| CN | 112717421 | A | 4/2021 |
| CN | 112891931 | A | 6/2021 |
| CN | 113617033 | A | 11/2021 |
| JP | 7-185126 | A | 7/1995 |
| JP | 2020-62159 | A | 4/2020 |
| JP | 2020-110351 | A | 7/2020 |
| JP | 2020-120929 | A | 8/2020 |

OTHER PUBLICATIONS

"[Arcade Didiia FF] Y'shtola tutorial video", Youtube, Dec. 5, 2015, pp. 2-7 (6 Pages).
Japanese Office Action dated Oct. 8, 2024 in Application No. 2023-571299.
"Cauldron Moe New Commentary Heroes Kill Strongs 3v3 Squad National Team", Bilibili, Online Video Published on Jun. 27, 2018, Accessed via the Internet: https://www.bilibili.com/video/BV1ds411V73N/?buvid=XU9137293F467527D13BDF148EB38E9214212&is_story_h5=false&mid=PwuQClgCfSxS2GwvihzGnA%3D%3D&p=1&plat_id=114&share_from=ugc&share_medium=android&share_plat=android&share_session_id=535a0cfa-d862-454d-bd83-93d2fa3036c5&share_source=COPY&share_tag=s_i&timestamp=1682412884&unique_k=7ukYtol&up_id=15466733.
Written Opinion for PCT/CN2022/104931, dated Aug. 25, 2022.
International Search Report for PCT/CN2022/104931, dated Aug. 25, 2022.

* cited by examiner

VIRTUAL CHARACTER SELECTION METHOD AND APPARATUS, TERMINAL, AND STORAGE MEDIUM

CROSS-REFERENCE TO RELATED APPLICATION(S)

This application is a continuation application of International Application No. PCT/CN2022/104931 filed on Jul. 11, 2022, which claims priority to Chinese Patent Application No. 202110926977.6 filed with the China National Intellectual Property Administration on Aug. 12, 2021, the disclosures of which are incorporated herein by reference in their entireties.

FIELD

The disclosure relates to the field of computer and Internet technologies, in particular, to a virtual character selection method and apparatus, a terminal, and a storage medium.

BACKGROUND

Currently, before starting a competitive battle, a participator corresponding to the competitive battle (i.e., a player, a user, etc.) may select a virtual character used in the competitive battle according to actual situations.

When a user selects a virtual character, if a client receives a selection operation for a certain virtual character triggered by the user, the client uses the virtual character as a virtual character used by the user in this competitive battle; if the client does not receive a selection operation for a virtual character triggered by the user by the end of selection period, the client allocates a virtual character to the user when the competitive battle is started.

However, because the client allocates the virtual character to the user only when the competitive battle is started, and other users cannot know the virtual character used by the user in the competitive battle in a virtual character selection process, the other users cannot reasonably arrange a lineup of the competitive battle.

SUMMARY

Embodiments of the disclosure provide a virtual character selection method and apparatus, a terminal, and a storage medium, capable of improving rationality and reliability of virtual character selection by other users, and improving user experience in a competitive battle. The technical solutions are as follows.

According to some embodiments, a virtual character selection method is provided. The method is performed by a terminal, and includes:

- displaying a character selection interface of a competitive battle, the character selection interface being a user interface to select and display a virtual character participating in the competitive battle;
- displaying a remaining duration of a character selection phase; and
- displaying character information of a first virtual character selected by a system for a first user in the character selection interface based on the remaining duration meeting a first condition and the first user not selecting the virtual character.

According to one aspect of some embodiments, a virtual character selection apparatus is provided. The apparatus includes: at least one memory configured to store program code; and at least one processor configured to read the program code and operate as instructed by the program code, the program code comprising:

- interface display code configured to display a character selection interface of a competitive battle, the character selection interface being a user interface to select and display a virtual character participating in the competitive battle;
- duration display code configured to display a remaining duration of a character selection phase; and
- character display code configured to display character information of a first virtual character selected by a system for a first user in the character selection interface based on the remaining duration meeting a first condition and the first user not selecting the virtual character.

According to one aspect of some embodiments, a terminal is provided, including a processor and a memory, the memory storing a computer program, and the computer program being loaded and executed by the processor to implement the above-mentioned virtual character selection method.

According to one aspect of some embodiments, a non-transitory computer readable storage medium storing computer code that when executed by at least one processor causes the at least one processor to implement the above-mentioned virtual character selection method.

According to one aspect of some embodiments, a computer program product or a computer program is provided, the computer program product or computer program including computer instructions, and the computer instructions being stored in a computer readable storage medium. A processor of a server reads the computer instructions from the computer readable storage medium, and the processor executes the computer instructions, causing the server to execute the above-mentioned virtual character selection method. A processor of a terminal reads the computer instructions from the computer readable storage medium, and the processor executes the computer instructions, causing the terminal to execute the above-mentioned virtual character selection method.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
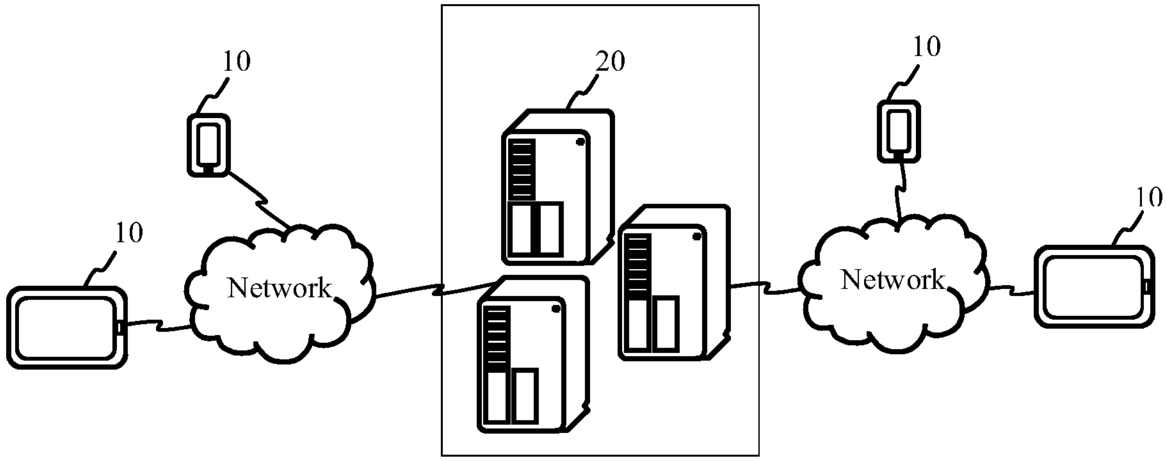
FIG. 1 is a schematic diagram of a virtual character selection system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

"A plurality of" mentioned in the herein means two or more. "And/or" describes an association relationship of associated objects and represents that there may be three relationships. For example, A and/or B may represent: only A, both A and B, and only B. The character "/" generally indicates an "or" relationship between the contextually associated objects. In addition, the operation numbers described herein merely show a possible execution sequence of the operations in some embodiments. In some other embodiments, the above-mentioned operations may not be performed according to the sequence of the numbers. For example, two operations with different numbers may be performed simultaneously, or two operations with different numbers may be performed according to a sequence contrary to the sequence shown in the drawings. This is not limited herein.

The technical solutions provided in the embodiments of the disclosure can achieve the following beneficial effects:

when a remaining duration of a character selection phase meets a first condition and a first user does not select a virtual character, a first virtual character is selected for the first user by a system, and character information of the first virtual character is displayed in the character selection interface, so that the character selection interface may display the character information of the first virtual character that the user may use in the competitive battle in a case that the first user does not select a virtual character, so as to make it convenient for other users to reasonably arrange a lineup of the competitive battle according to the character information of the first virtual character, thereby improving rationality and reliability of virtual character selection by the other users, and improving user experience in the competitive battle.

FIG. 1 is a schematic diagram of a virtual character selection system according to some embodiments. The virtual character selection system may include: a terminal 10 and a server 20.

The terminal 10 may be an electronic device such as a mobile phone, a tablet computer, a game console, an e-reader, a multimedia playback device, a wearable device, or a Personal Computer (PC). A client of an application (e.g., a game application) may be installed in the terminal 10. In some embodiments, the application may be an application needing to be downloaded and installed, or may be a click-to-run application. This is not limited herein.

In some embodiments, the above-mentioned application may be any application allowing a competitive battle. For example, the application may be a Multiplayer Online Battle Arena (MOBA) game, a Third-Personal Shooting Game (TPS), a First-Person Shooting Game (FPS), a multiplayer gun shooting survival game, a Virtual Reality (VR) shooting application, an Augmented Reality (AR) application, a three-dimensional map program, a social application, an interactive entertainment application, and the like. Additionally, for different applications, forms of virtual characters provided by the applications may also be different, and corresponding functions may also be different. These may be pre-configured according to actual requirements, and are not limited in some embodiments. In some embodiments, a same application may also provide a variety of virtual characters having different functions for a user corresponding to a competitive battle. This is not limited herein.

The above-mentioned virtual characters are virtual characters controlled by users in an application. Taking the application being a game application as an example, the virtual characters are game characters controlled by users in the game application. The virtual characters may be in the form of human beings, animals, and cartoons, or may be in other forms. This is not limited herein. The virtual characters may be displayed in three-dimensional forms or in two-dimensional forms. This is not limited herein.

In some embodiments, the above-mentioned virtual characters include virtual characters in a same camp and virtual characters in different camps, that is, in the application, the virtual characters are divided into different camps. In some embodiments, taking a MOBA game as an example, ten users are matched for a game, and divided into two teams, i.e., a red team and a blue team, and every five people form a group. At this time, the red team and virtual characters in the red team are in a same camp and are teammates, the blue team and virtual characters in the blue team are in a same camp and are teammates, and the virtual characters in the red team and the blue team are in different camps and are in an adversarial relationship with each other. In some embodiments, the above-mentioned virtual characters may include a variety of virtual characters having different functions as teammates. In some embodiments, functions respectively corresponding to the variety of virtual characters may be combined with each other to form functional gains.

The server 20 is configured to provide a background service for a client of an application in the terminal 10. For example, the server 20 may be a background server of the above-mentioned application. The server 20 may be one server, a server cluster including a plurality of servers, or a cloud computing service center. In some embodiments, the server 20 provides background services for applications in multiple terminals 10.

The terminal 10 and the server 20 may communicate with each other by using a network.

Figure 2:
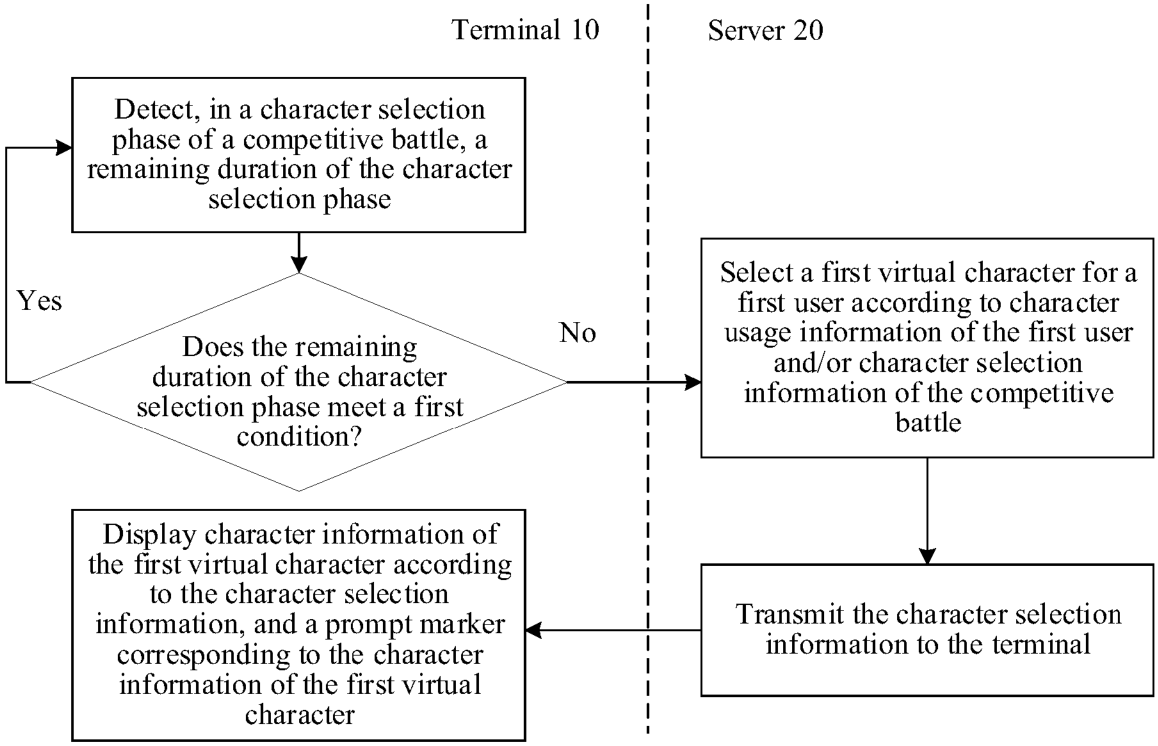
FIG. 2 is a schematic diagram of a virtual character selection mode according to some embodiments.

In some embodiments, the server 20 is configured to provide a character selection function for the terminal 10. In some embodiments, as shown in FIG. 2, in a character selection phase of a competitive battle, the terminal 10 detects a remaining duration of the character selection phase, and determines whether the remaining duration of the character selection phase meets a first condition. If the remaining duration of the character selection phase does not meet the first condition, the terminal continues to detect the remaining duration. If the remaining duration of the character selection phase meets the first condition, the server 20 selects a first virtual character for a first user according to character usage information of the first user and/or character selection information of the competitive battle. The character usage information of the first user is used for indicating historical usages of virtual characters by the first user. The character selection information of the competitive battle is used for indicating virtual character selection of a second user participating in the competitive battle other than the first user, and the second user may include a teammate of the first user and/or an adversarial user of the first user. Then, the server 20 transmits character selection information to the terminal 10. The character selection information includes identifier information of the first virtual character. Furthermore, the client displays character information of the first virtual character according to the character selection information, and a prompt marker corresponding to the character information of the first virtual character. The prompt marker is used for marking the first virtual character as a virtual character allocated by the server for the first user.

In some embodiments, the first virtual character may also be selected by the terminal 10 for the first user according to the character usage information of the first user and/or the character selection information of the competitive battle.

Figure 3:
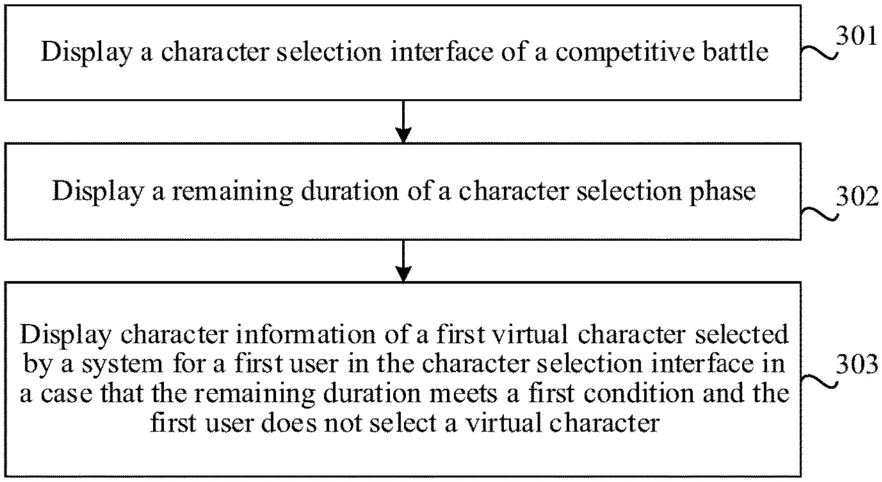
FIG. 3 is a flowchart of a virtual character selection method according to some embodiments.

FIG. 3 is a flowchart of a virtual character selection method according to some embodiments. The method may be applied in the terminal 10 in the game running environment shown in FIG. 1, for example, an execution subject of the operations may be a client of an application installed in the terminal 10. The method may include the following operations (301-303):

Operation 301: Display a character selection interface of a competitive battle.

The competitive battle may be a battle in which virtual characters in different camps compete. The competitive battle includes virtual characters in at least two camps, and the quantities of virtual characters in different camps may be the same or different. In some embodiments, the functions of virtual characters contained in different camps of a same competitive battle may be the same or different. In some embodiments, the competitive battle may also be a battle in which a task requires to be completed by forming a team by different virtual characters. For example, a plurality of users corresponding to the competitive battle may be virtual characters having different functions to obtain a necessary lineup to complete the task; or, a plurality of users corresponding to a competitive battle may be virtual characters having different functions to obtain a lineup having functional gains.

In some embodiments, before starting a competitive battle, users participating in the competitive battle select virtual characters according to actual situations. The virtual characters are virtual character controlled by the users in the competitive battle. A user may control one or more virtual characters in the competitive battle. This is not limited herein. In other words, before starting a competitive battle, a user may select one or more virtual characters, and the quantities of virtual characters selected by different users may be the same or different. This is not limited herein. In some embodiments, when a user selects a plurality of virtual characters, the user may use a certain user account to select a plurality of virtual characters; or, the user may also use a plurality of user accounts to select a plurality of virtual characters, and different virtual characters correspond to different user accounts.

In some embodiments, before starting a competitive battle, a client displays a character selection interface of the competitive battle. The character selection interface is a user interface used for selecting and displaying a virtual character participating in the competitive battle.

In some embodiments, the character selection interface includes options for at least one virtual character, and a user selects a virtual character used in the competitive battle by a touch operation for a certain option. The touch operation may be a click operation, a long press operation, a drag operation, a voice operation, a gesture operation, a button press operation, and the like. This is not limited herein. The above-mentioned user is a user of the client. This is not limited herein.

Figure 4:
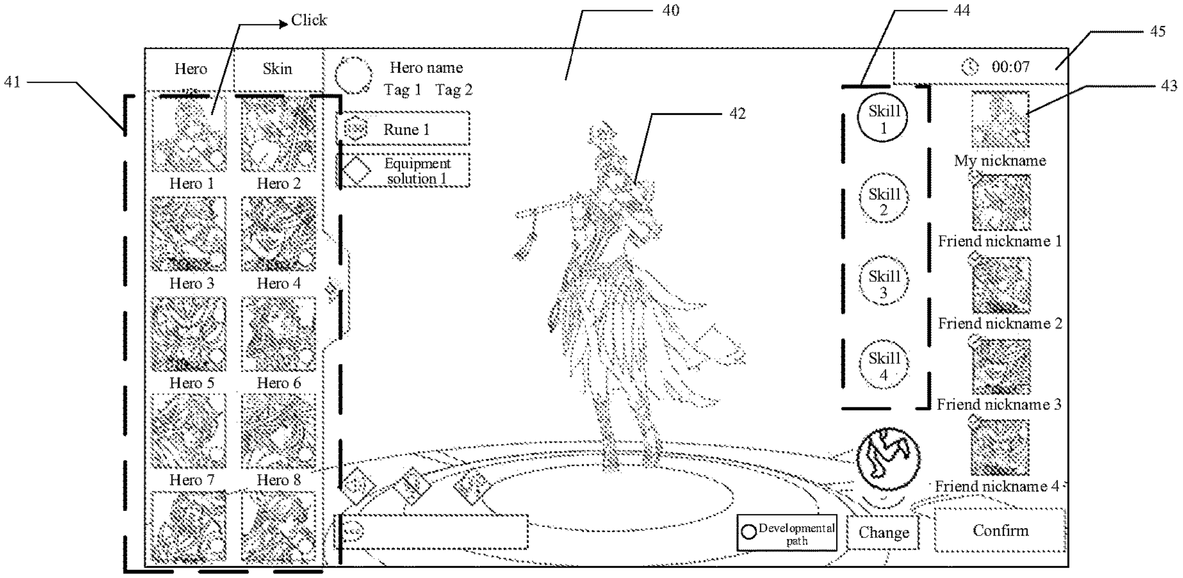
FIG. 4 is a schematic diagram of a character selection interface according to some embodiments.

As shown in FIG. 4, a character selection interface 40 includes options 41 for a plurality of virtual characters. After a user clicks on an option for a certain virtual character, a virtual character appearance 42, a virtual character avatar 43, and virtual character skills 44 corresponding to the option are displayed in the character selection interface 40. The virtual character appearance 42, the virtual character avatar 43, and the virtual character skills 44 may be generally called character information of the virtual character. In some embodiments, the content contained in the character information may be flexibly configured and adjusted according to actual situations. This is not limited herein.

In some embodiments, the first user corresponds to a first user account, the first user account is an account of the first user, and the first user may perform a variety of operations in the competitive battle by using the first user account. In other words, in some embodiments, the operations performed by the first user are also called operations performed by the first user account, and the first user may also be called the first user account.

Operation 302: Display a remaining duration of a character selection phase.

In some embodiments, after displaying the above-mentioned character selection interface, the client may display the remaining duration of the character selection phase in the character display interface, or highlight the remaining duration of the character selection phase in the form of a floating window. This is not limited herein. The character selection phase is a phase for a user to select a character. In some embodiments, starting times and ending times of character selection phases for different users may be the same or different. This is not limited herein.

In some embodiments, starting times and ending times of character selection phases for different users are the same. In this case, when displaying the remaining duration of the character selection phase, the client does not need to perform switching on the remaining duration. When the remaining duration is zero, the character selection phases for all users end.

In some embodiments, starting times and ending times of character selection phases for different users are different. In this case, when displaying the remaining duration of the character selection phase, the client needs to perform switching on the remaining duration for display. When the remaining duration is zero, the client determines that the character selection phase for a current user ends, and the character selection phase for a next user starts, and the client displays the remaining duration of the character selection phase for the next user in the character selection interface. In some embodiments, durations of the character selection phases for different users may be the same or different. If the durations of the character selection phases for different users are different, the client needs to first obtain the duration of the character selection phase for the next user at a transition moment of the character selection phases for adjacent users, and based on this duration, displays the remaining duration in the character selection interface. If the durations of the character selection phases for different users are the same, the above-mentioned remaining duration is displayed in the character selection interface in a cyclical form, and at the transition moment of the character selection phases for adjacent users, the client does not need to obtain the duration of the character selection phase for the next user, and directly adjusts the remaining duration from zero to the maximum value.

In some embodiments, the above-mentioned remaining duration may be displayed at the beginning of the character selection phase; or, the above-mentioned remaining duration may be displayed after the beginning of the character selection phase, for example, the remaining duration is displayed when the remaining duration of the character selection phase is less than or equal to a target value to prompt the user. The above-mentioned target value may be any value, and the target value may be flexibly configured and adjusted according to actual situations. This is not limited herein.

In some embodiments, the above-mentioned remaining duration may be displayed at any position of the character selection interface, for example, as shown in FIG. 4, the remaining duration 45 of the character selection phase is displayed at the upper right corner of the character selection interface 40.

In some embodiments, there is a character selection phase for at least one other user having a starting time and an ending time the same as those of the character selection phase for the first user. The other user and the first user belong to a same camp. For example, the first user and the second user select virtual characters at a same character selection phase, and the first user and the second user may belong to a same camp, or may belong to different camps.

Operation 303: Display character information of a first virtual character selected by a system for a first user in the character selection interface in a case that the remaining duration meets a first condition and the first user does not select a virtual character.

In some embodiments, after displaying the above-mentioned character selection interface, the client performs detection on the character selection interface. In some embodiments, in a case that a selection operation for a certain virtual character is detected, the selected virtual character is determined as a virtual character used by the first user in the competitive battle, and character information of the virtual character is displayed; and in a case that no selection operation for any virtual character is detected, a virtual character is selected by the system for the first user, and character information of the virtual character is displayed.

In some embodiments, the client displays the character information of the first virtual character selected by the system for the first user in the character selection interface in a case that the remaining duration meets the first condition and the first user does not select a virtual character.

The above character information of the first virtual character is information capable of indicating the first virtual character. In some embodiments, the character information of the first virtual character includes but is not limited to at least one of the following: a name of the first virtual character, an appearance of the first virtual character, an avatar of the first virtual character, skills of the first virtual character, and the like. In some embodiments, while displaying the character information of the first virtual character, the client displays a prompt marker corresponding to the character information of the first virtual character on the character selection interface. The prompt marker is used for marking the first virtual character as a virtual character allocated by the system for the first user. In some embodiments, the prompt marker may be displayed at any position of the character selection interface. This is not limited herein.

Figure 5:
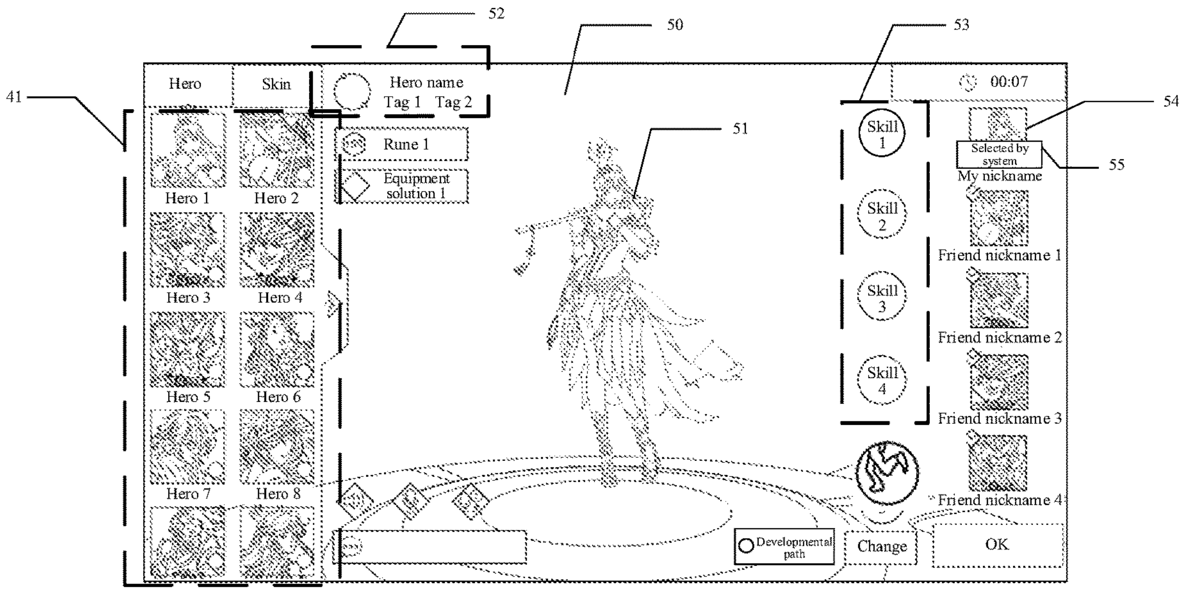
FIG. 5 is a schematic diagram of a character selection interface according to some embodiments.

As shown in FIG. 5, in a case that the remaining duration of the character selection phase for the first user meets the first condition, and the first user does not select a virtual character, the client displays an appearance 51 of the first virtual character, a name 52 of the first virtual character, skills 53 of the first virtual character, and an avatar 54 of the first virtual character in the character selection interface 50. Moreover, the character selection interface 50 includes a prompt marker 55 corresponding to the character information of the first virtual character, and the prompt marker 55 includes the words "selected by system".

The above-mentioned first condition is a determining condition for determining whether to allocate a virtual character for the first user, and the first condition may be flexibly configured and adjusted according to actual situations. This is not limited herein.

In some embodiments, the above-mentioned first condition is that the remaining duration is less than or equal to a first value. The first value may be any value greater than 0, such as 20 s, 10 s, 8 s, and 5 s. This is not limited herein. In some embodiments, after displaying the above-mentioned character selection interface, the client detects the remaining duration of the character selection phase, and then after the remaining duration is less than or equal to the above first value, a first virtual character is allocated to the first user by the system. The above-mentioned first value may be a value configured by the system, or may be a value customized by the first user. This is not limited herein.

In some embodiments, considering that the total durations of character selection phases corresponding to the first user in different competitive battles may be different, the above-mentioned first condition is that the proportion of the remaining duration in the total duration of the character selection phase is less than or equal to a first required value. In some embodiments, after displaying the above-mentioned character selection interface, the client detects the remaining duration of the character selection phase, and a first virtual character is allocated to the first user by the system in a case that the proportion of the remaining duration in the total duration of the character selection phase is less than or equal to the above-mentioned first required value. The above-mentioned first required value may be a value configured by the system, or may be a value customized by the first user. This is not limited herein.

In some embodiments, the system may also obtain a division time point corresponding to the character selection phase in advance based on the above-mentioned first required value. The division time point is used for separating a character selection duration and a character allocation duration in the total duration of the character selection phase. The character allocation duration is a duration during which the system can allocate a virtual character to the first user, and the character selection duration is a duration during which the first user can customize selection of a virtual character. In some embodiments, assuming that the first requirement value is 60% and the total duration of the character selection phase is 120 s, the character allocation duration is 72 s (120*0.6), and the character selection duration is 48 s (120*0.4). In some embodiments, during detection of the character selection phase by the client, the system determines, based on the division time point, whether the character selection phase enters a phase of the character allocation duration, and allocates a first virtual character for the first user when the character selection phase enters the phase of the character allocation duration. In the above-mentioned character allocation duration, the user may also customize selection of a virtual character. Moreover, in this case, if the client detects a selection operation of the user for a certain virtual character, there is no need for the system to select a first virtual character for the first user, and the virtual character selected by the first user is directly determined as a virtual character used by the first user in the competitive battle.

In some embodiments, in order to improve the efficiency of virtual character selection, the above-mentioned first condition is that other users before the first user in character selection sequence have completed character selection. The other users are users in the same camp as the first user in the competitive battle. The completion of character selection means that the users have selected the virtual characters to use and determined not to actively change the virtual characters. After displaying the above-mentioned character selection interface, the client may detect character selection of other users. When determining that other users before the first user in character selection sequence have completed character selection, a first virtual character is selected by the system for the first user. In some embodiments, the above-mentioned character selection sequence may be determined according to user attribute information. The user attribute information includes but is not limited to at least one of the following: a matching time of a user for a competitive battle, comprehensive ranking of the user in historical competitive battles, and the like. In some embodiments, if the matching time of a user A for the competitive battle is before the matching time of a user B, the user A is before the user B in character selection sequence; and if the comprehensive ranking of the user A in historical competitive battles is higher than the comprehensive ranking of the user B, the user A is before the user B in character selection sequence.

In some embodiments, first conditions corresponding to different users may be the same or different. This is not limited herein.

In some embodiments, when displaying the character information of the first virtual character, the client determines the first virtual character selected by the system for the first user based on first reference information, and then displays the character information of the first virtual character in the character selection interface. The first reference information includes but is not limited to at least one of the following: character usage information of the first user, and character selection information of the competitive battle. The character usage information of the first user is used for indicating historical usages of virtual characters by the first user. The character selection information of the competitive battle is used for indicating virtual character selection of a second user participating in the competitive battle other than the first user, and the second user includes a teammate user and an adversarial user. In some embodiments, the above-mentioned first reference information may be information obtained in real time when selecting the first virtual character, or information obtained and stored in advance. This is not limited herein. A first virtual object, which not only conforms to usage habits of the first user but also conforms to actual situations of the competitive battle, may be obtained based on the character usage information of the first user and the character selection information of the competitive battle, thereby improving rationality of selection of the first virtual object, and further improving user experience in the competitive battle.

In some embodiments, the second user corresponds a second user account, the second user account is an account of the second user, and the second user may perform a variety of operations in the competitive battle by using the second user account. In other words, operations performed by the second user are also called operations performed by the second user account, and the second user may also be called the second user account.

In some embodiments, the first user is allowed to change the first virtual character to another virtual character after the first virtual character is selected by the above-mentioned system; or, the first user is not allowed to change the first virtual character to another virtual character after the first virtual character is selected by above-mentioned system. The above-mentioned system may a system provided in the client, and may also be a system provided in the server. This is not limited herein.

In summary, in the technical solutions according to some embodiments, when the remaining duration of the character selection phase is a first value and the first user does not select a virtual character, a first virtual character is selected for the first user by the system, and the character information of the first virtual character is displayed in the character selection interface, so that the character selection interface can also display the character information of the first virtual character that the user may use in the competitive battle in a case that the first user does not select a virtual character, so as to make it convenient for other users to reasonably arrange a lineup of the competitive battle according to the character information of the first virtual character, thereby improving rationality and reliability of virtual character selection by the other users, and improving user experience in the competitive battle.

A selection method for the first virtual character is introduced as follows. The above-mentioned system may be provided in the client or in the server, and therefore, the selection method for the first virtual character may be executed by the client or by the server. For ease of understanding, the following only describes the selection method for the first virtual character from the perspective of the client.

In some embodiments, a process of selecting the first virtual character based on the above-mentioned first reference information is as follows:

1. Determine at least one candidate virtual character according to the character usage information of the first user.

In some embodiments, after obtaining the above-mentioned first reference information, the client obtains the character usage information of the first user from the first reference information, and determines at least one candidate virtual character.

In some embodiments, in a case that the character usage information of the first user includes quantities of historical usage times of the virtual characters by the first user, the client determines virtual characters having the quantities of historical usage times meeting a first sub-condition as candidate virtual characters. In some embodiments, the first sub-condition may be that the quantity of historical usage times is greater than or equal to a first threshold; or, the first sub-condition may also be that the quantity of historical selection times is ranked top n1 after the quantities of historical usage times are sorted in descending order. The above-mentioned first threshold may be any value, and the first threshold may be flexibly configured and adjusted according to actual situations. This is not limited herein. The above-mentioned n1 is any positive integer greater than one, and n1 may be flexibly configured and adjusted according to actual situations. This is not limited herein. In some embodiments, n1 is equal to a set quantity of candidate virtual characters.

In some embodiments, in a case that the character usage information of the first user includes battle winning rates of the first user for the virtual characters, the client determines virtual characters having the battle winning rates meeting a second sub-condition as candidate virtual characters. The battle winning rate is a ratio of the quantity of victories in competitive battles corresponding to a virtual character to the total quantity of the competitive battles. In some embodiments, the above-mentioned second condition may be that the battle winning rate is greater than or equal to a second threshold; or, the second condition may also be that the battle winning rate is ranked top n2 after the battle winning rates are sorted in descending order. The above-mentioned second threshold may be any value, and the second threshold may be flexibly configured and adjusted according to actual situations. This is not limited herein. The above-mentioned n2 is any positive integer greater than one, and the n2 may be flexibly configured and adjusted according to actual situations. This is not limited herein. In some embodiments, n2 is equal to a set quantity of candidate virtual characters.

In some embodiments, in a case that the character usage information of the first user includes usage proficiencies of the virtual characters by the first user, the client determines virtual characters having the usage proficiencies meeting a third sub-condition as candidate virtual characters. The use proficiency is determined based on performance of a virtual character in historical competitive battles. In some embodiments, the above-mentioned third sub-condition may be that the use proficiency is greater than or equal to a third threshold; or, the third condition may also be that the use proficiency is ranked top n3 after the use proficiencies are sorted in descending order. The above-mentioned third threshold may be any value, and the third threshold may be flexibly configured and adjusted according to actual situations. This is not limited herein. The above-mentioned n3 is any positive integer greater than one, and the n3 may be flexibly configured and adjusted according to actual situations. This is not limited herein. In some embodiments, n3 is equal to a set quantity of candidate virtual characters.

In some embodiments, in a case that the character usage information of the first user includes latest usage moments of the virtual characters by the first user, the client determines virtual characters having the latest usage moments meeting a fourth sub-condition as candidate virtual characters. In some embodiments, the above-mentioned fourth condition is most recently used n4 virtual characters. The above-mentioned n4 is any positive integer greater than one, and the n4 may be flexibly configured and adjusted according to actual situations. This is not limited herein. In some embodiments, n4 is equal to a set quantity of candidate virtual characters.

In some embodiments, the client may also determine the candidate virtual character based on several items in the above-mentioned first reference information. By determining the candidate virtual character based on at least one of the quantities of historical usage times of the virtual characters by the first user, the battle winning rates of the first user for the virtual characters, the usage proficiencies of the virtual characters by the first user, the latest usage moments of the virtual characters by the first user, and the like, a first virtual object more suitable for the first user can be obtained, thereby improving the user experience of the first user.

2. Select a first virtual character from the at least one candidate virtual character according to the character selection information of the competitive battle.

In some embodiments, after obtaining the above-mentioned at least one candidate virtual character, the client selects a first virtual character from the at least one candidate virtual character according to the character selection information of the competitive battle in the first reference information.

In some embodiments, after obtaining the character selection information of the competitive battle, the client determines a selected virtual character of a second user according to the character selection information of the competitive battle; and the client obtains a matching indicator and/or a restraining indicator between each candidate virtual character and the selected virtual character, and determines a first virtual character from the above-mentioned at least one candidate virtual character according to the matching indicator and/or the restraining indicator.

The matching indicator is used for indicating a cooperation degree between the candidate virtual character and the selected virtual character in the competitive battle. When obtaining the matching indicator, for a target candidate virtual character in the at least one candidate virtual character, the client may obtain first matching indicators between the target candidate virtual character and selected virtual characters, and performs summation processing on the first matching indicators to obtain a matching indicator between the target candidate virtual character and the selected virtual characters. In some embodiments, before obtaining the matching indicator, the client may select a virtual character selected by a teammate from the aforementioned selected virtual characters, and only obtain a matching indicator between the candidate virtual character and the virtual character selected by the teammate.

The restraining indicator is used for indicating a battle threat degree between the candidate virtual character and the selected virtual character in the competitive battle. In some embodiments, when obtaining the restraining indicator, for a target candidate virtual character in the at least one candidate virtual character, the client obtains first restraining indicators between the target candidate virtual character and selected virtual characters, and performs summation processing on the first restraining indicators to obtain a restraining indicator between the target candidate virtual character and the selected virtual characters. In some embodiments, before obtaining the restraining indicator, the client may select a virtual character selected by an adversarial user from the selected virtual characters, and only obtain a restraining indicator between the candidate virtual character and the virtual character selected by the adversarial user.

In some embodiments, the above-mentioned second user is a teammate of the first user. In this case, the client selects the first virtual character according to the above-mentioned matching indicator. In some embodiments, after obtaining the matching indicator between each candidate virtual character and the selected virtual character, the client determines a candidate virtual character having the highest matching indicator as the above-mentioned first virtual character.

In some embodiments, the above-mentioned second user is an adversarial user of the first user. In this case, the client selects the first virtual character according to the above-mentioned restraining indicator. In some embodiments, after obtaining the restraining indicator between each candidate virtual character and the selected virtual character, the client determines a candidate virtual character having the highest restraining indicator as the above-mentioned first virtual character.

In some embodiments, the above-mentioned second user includes a teammate and an adversarial user of the first user. In this case, the client selects the first virtual character according to the above-mentioned matching indicator and the above-mentioned restraining indicator. In some embodiments, the client obtains a matching indicator between each candidate virtual character and the selected virtual character of the teammate, and a restraining indicator between each candidate virtual character and the selected virtual character of the adversarial user; then, the client obtains one or more candidate virtual characters having the matching indicators greater than or equal to a first target value, and generates a first candidate virtual character set; and the client obtains one or more candidate virtual characters having the restraining indicators greater than or equal to a second target value, and generates a second candidate virtual character set. If the first candidate virtual character set and the second candidate virtual character set have same candidate virtual characters, a same candidate virtual character having the highest matching indicator (or highest restraining indicator) is determined as the first virtual character; if the first candidate virtual character set and the second candidate virtual character set do not have same candidate virtual characters, a candidate virtual character having the highest matching indicator (or highest restraining indicator) is directly determined as the first virtual character. A first virtual object that not only conforms to the lineup of the own side but also restrains the lineup of the enemy side may be obtained according to the matching indicator and the restraining indicator, thereby improving rationality of selection of the first virtual object, and further improving user experience in the competitive battle.

In some embodiments, a process of selecting the first virtual character based on the above-mentioned first reference information is as follows:

1. Determine at least one first candidate virtual character according to the character selection information of the competitive battle.

In some embodiments, after obtaining the above-mentioned first reference information, the client determines at least one first candidate virtual character according to the character selection information of the competitive battle in the first reference information.

In some embodiments, after obtaining the character selection information of the competitive battle, the client determines a selected virtual character of a second user according to the character selection information of the competitive battle; further, the client obtains a matching indicator and/or a restraining indicator between each virtual character and the selected virtual character, and determines at least one first candidate virtual character from the virtual characters according to the matching indicator and/or the restraining indicator. The above-mentioned virtual characters are all virtual characters that may be provided by the competitive battle for the first user, and in some embodiments, the all virtual characters are virtual characters that the first user has permission to use. The matching indicator is used for indicating a cooperation degree between the virtual character and the selected virtual character in the competitive battle. The restraining indicator is used for indicating a battle threat degree between the virtual character and the selected virtual character in the competitive battle.

In some embodiments, the above-mentioned second user is a teammate of the first user. In this case, the client selects the first candidate virtual character according to the above-mentioned matching indicator. In some embodiments, after obtaining the matching indicator between each virtual character and the selected virtual character, the client determines virtual characters having the matching indicators greater than or equal to a first threshold value as first candidate virtual characters; or, after obtaining the matching indicator between each virtual character and the selected virtual character, the client sorts the matching indicators in descending order, and then determines virtual characters ranked top m1 as first candidate virtual characters. The above-mentioned first threshold value may be any value, and the first threshold value may be flexibly configured and adjusted according to actual situations. This is not limited herein. The above-mentioned m1 is any positive integer greater than one, and the m1 may be flexibly configured and adjusted according to actual situations. This is not limited herein. In some embodiments, m1 is equal to a set quantity of first candidate virtual characters.

In some embodiments, the above-mentioned second user is an adversarial user of the first user. In this case, the client selects the first candidate virtual character according to the above-mentioned restraining indicator. In some embodiments, after obtaining the restraining indicator between each virtual character and the selected virtual character, the client determines virtual characters having the restraining indicators greater than or equal to a second threshold value as first candidate virtual characters; or, after obtaining the restraining indicator between each virtual character and the selected virtual character, the client sorts the restraining indicators in descending order, and then determines virtual characters ranked top m2 as first candidate virtual characters. The above-mentioned second threshold value may be any value, and the second threshold value may be flexibly configured and adjusted according to actual situations. This is not limited herein. The above-mentioned m2 is any positive integer greater than one, and the m2 may be flexibly configured and adjusted according to actual situations. This is not limited herein. In some embodiments, m2 is equal to a set quantity of first candidate virtual characters.

In some embodiments, the above-mentioned second user includes a teammate and an adversarial user of the first user. In this case, the client selects the first candidate virtual character according to the above-mentioned matching indicator and the above-mentioned restraining indicator. In some embodiments, the client obtains a matching indicator between each virtual character and the selected virtual character of the teammate, and a restraining indicator between each virtual character and the selected virtual character of the adversarial user; then, the client obtains one or more candidate virtual characters having the matching indicators greater than the first threshold value, and generates a first virtual character set; and the client obtains one or more candidate virtual characters having the restraining indicators greater than the second threshold value, and generates a second virtual character set. If the first virtual character set and the second virtual character set have same virtual characters, the same virtual characters are determined as first candidate virtual characters; If the first virtual character set and the second virtual character set do not have a same candidate virtual character, virtual characters in the first virtual character set and the second virtual character set are directly determined as first candidate virtual characters.

2. Select a first virtual character from the at least one first candidate virtual character according to the character usage information of the first user.

In some embodiments, after obtaining the above-mentioned at least one first candidate virtual character, the client selects a first virtual character from the at least one first candidate virtual character according to the character usage information of the first user in the first reference information.

In some embodiments, in a case that the character usage information of the first user includes quantities of historical usage times of the first candidate virtual characters by the first user, the client determines a first candidate virtual character having the highest quantity of historical usage times as a first virtual character. In some embodiments, in a case that the character usage information of the first user includes battle winning rates of the first user for the first candidate virtual characters, the client determines a first candidate virtual character having the highest battle winning rate as a first virtual character. In some embodiments, in a case that the character usage information of the first user includes usage proficiencies of the first candidate virtual characters by the first user, the client determines a first candidate virtual character having the highest usage proficiency as a first virtual character. In some embodiments, in a case that the character usage information of the first user includes latest usage moments of the first candidate virtual characters by the first user, the client determines a first candidate virtual character most recently used as a first virtual character.

In some embodiments, the client may also select a first virtual character for the first user only according to the character selection information of the first user; or, the client may also select a first virtual character for the first user only according to the character selection information of the competitive battle.

In a case that the first virtual character is selected for the first user only according to the character selection information of the first user, if the character usage information of the first user includes the quantities of historical usage times of the virtual characters by the first user, the client determines a virtual character having the highest quantity of historical usage times as the first virtual character; if the character usage information of the first user includes the battle winning rates of the first user for the virtual characters, the client determines a virtual character having the highest battle winning rate as the first virtual character; if the character usage information of the first user includes the usage proficiencies of the virtual characters by the first user, the client determines a candidate virtual character having the highest usage proficiency as the first virtual character; and if the character usage information of the first user includes the latest usage moments of the virtual characters by the first user, the client determines a virtual character most recently used as the first virtual character.

In a case that the first virtual character is selected for the first user only according to the character selection information of the competitive battle, if the above-mentioned second user is a teammate of the first user, the client determines a virtual character having the highest matching indicator as the first virtual character; and if the above-mentioned second user is an adversarial user of the first user, the client determines a virtual character having the highest restraining indicator as the first virtual character. Certainly, if the above-mentioned second user includes a teammate and an adversarial user of the first user, the client obtains one or more virtual characters having the matching indicators greater than a certain value and generates a first virtual character group, and obtains one or more virtual characters having the restraining indicators greater than another value and generates a second virtual character group. Then, if the first virtual character group and the second virtual character group have same virtual characters, a same virtual character having the highest matching indicator (or highest restraining indicator) is determined as the first virtual character; if the first virtual character group and the second virtual character group do not have same virtual characters, a virtual character having the highest matching indicator (or highest restraining indicator) is directly determined as the first virtual character.

Figure 6:
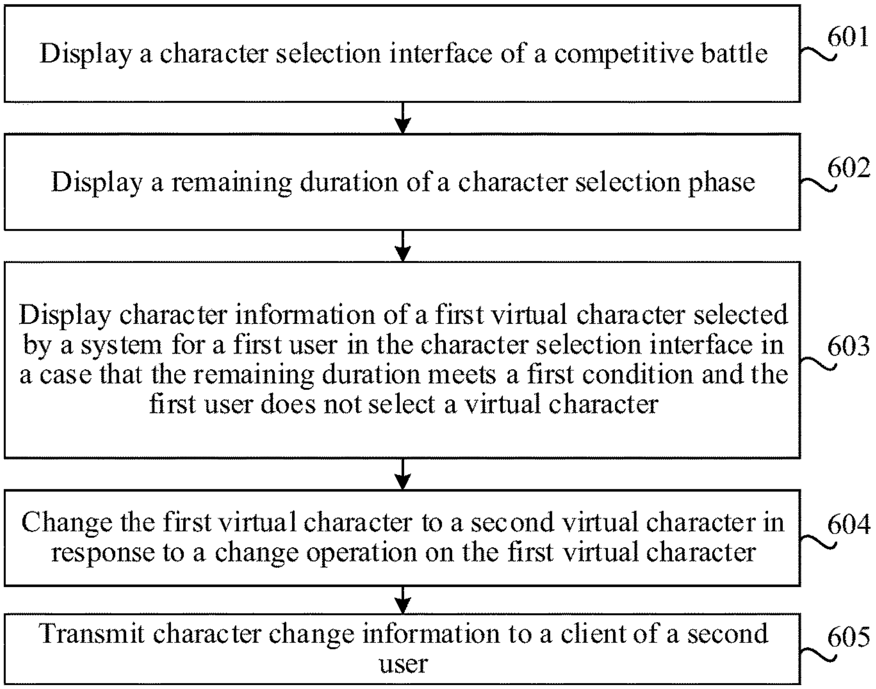
FIG. 6 is a flowchart of a virtual character selection method according to some embodiments.

The selection method for the first virtual character is introduced above. In some embodiments, after the first virtual character is selected by the system, the user may change the first virtual character to another virtual character according to actual situations. FIG. 6 is a flowchart of a virtual character selection method according to some embodiments. The method may be applied in the terminal 10 in the game running environment shown in FIG. 1, for example, an execution subject of the operations may be a client of an application installed in the terminal 10. The method may include the following operations (601-605):

Operation 601: Display a character selection interface in a character selection phase of a competitive battle.

Operation 602: Display a remaining duration of the character selection phase.

Operation 603: Display character information of a first virtual character selected by a system for a first user in the character selection interface in a case that the remaining duration meets a first condition and the first user does not select a virtual character.

Operations 601-603 above are the same as operations 301-303 in the embodiment of FIG. 3. For details, reference may be made to the embodiment of FIG. 3. Details are not described herein again.

Operation 604: Change the first virtual character to a second virtual character in response to a change operation on the first virtual character.

In some embodiments, after displaying the character information of the first virtual character, the client continues to perform detection on the character selection interface. When detecting a change operation on the first virtual character, the first virtual character is changed to a second virtual character. The second virtual character is a virtual character indicated by the above-mentioned change operation. In this way, use requirements of the first user may be taken into an account, thereby improving flexibility of selection of the first virtual object.

In some embodiments, the character selection interface includes options for at least one virtual character, and the user changes the first virtual character to another virtual character by a touch operation on a certain option. The above-mentioned second virtual character is a virtual character corresponding to the option targeted by the touch operation triggered by the user. In some embodiments, when determining to change the first virtual character to the second virtual character, the client cancels, in the character selection interface, display of the character information of the first virtual character and the prompt marker corresponding to the character information of the first virtual character, and displays character information of the second virtual character in the character selection interface. The character information of the second virtual character includes but is not limited to at least one of the following: a name of the second virtual character, an appearance of the second virtual character, an avatar of the second virtual character, skills of the second virtual character, and the like.

Operation 605: Transmit character change information to a client of a second user.

In some embodiments, the client changes the first virtual character to the second virtual character, and transmits character change information to the client of the second user. The character change information is used for indicating that the first user changes the first virtual character to the second virtual character. The client of the second user is used for displaying a shortcut switching prompt, and the shortcut switching prompt is used for shortcut switching from a third virtual character selected by the second user to a fourth virtual character. In some embodiments, the shortcut switching prompt includes an option for the fourth virtual character. The shortcut switching prompt may be displayed at any position on the character selection interface. In some embodiments, the shortcut switching prompt is displayed next to the targeted third virtual character. In this way, switching of the third virtual character may be quickly completed in response to switching of the first virtual character, thereby improving efficiency of switching the virtual characters.

In some embodiments, the client transmits the character change information to the client of the second user by a server. After receiving the character change information, the client of the second user then flexibly adjusts the third virtual character selected by the second user according to the second virtual character indicated by the character change information and in combination with a selected virtual character of another user, so as to generate a shortcut switching prompt. The above-mentioned other user is a user participating in the competitive battle other than the first user and the second user. The shortcut switching prompt is only used for providing the second user with a fourth virtual character that may be quickly switched to. Specifically, whether to change the third virtual character needs to be decided by the second user according to actual situations.

In some embodiments, if the second user is a teammate of the first user, matching indicators between the fourth virtual character and the selected virtual characters (including the second virtual character and the selected virtual character of the other user) are greater than matching indicators between the third virtual character and the selected virtual characters (including the second virtual character and the selected virtual character of the other user); if the second user is an adversarial user of the first user, restraining indicators between the fourth virtual character and the selected virtual characters (including the second virtual character and the selected virtual character of the other user) are greater than restraining indicators between the third virtual character and the selected virtual characters (including the second virtual character and the selected virtual character of the other user). In this way, switching rationality of a third virtual object can be improved.

In some embodiments, if the time difference between a trigger moment of the above-mentioned change operation for the first virtual character and an end moment of a character selection phase for the second user is less than or equal to a certain value, the client of the second user may extend the duration of the character selection phase for the second user. The above-mentioned value may be 0 s, 1 s, 2 s, or the like. This is not limited herein.

In some embodiments, after the system selects the first virtual character for the first user, the client may also transmit the character change information to the client of the second user, and then the client of the second user displays a shortcut switching prompt in the character selection interface, the shortcut switching prompt being used for shortcut switching from the third virtual character selected by the second user to a fourth virtual character. The first user and the second user belong to a same camp in the competitive battle.

In summary, in the technical solutions according to some embodiments, after the first virtual character is changed, the client of the second user may display a shortcut switching prompt, improving reliability of virtual character selection, and enabling the camp lineup more reasonable.

Automatic selection of a virtual character is introduced above. In some embodiments, the system may also select skill information for the first user to enter the competitive battle.

In some embodiments, the above-mentioned character selection interface includes options for at least one battle entry skill. The battle entry skill is a behavior that may be selected before the competitive battle. A user can configure a battle entry skill for the selected virtual character by triggering an option for a certain skill. In some embodiments, skill information of a first battle entry skill selected by the system for the first user is displayed in the character selection interface in a case that a battle entry skill selection phase meets a second condition and the first user does not select a battle entry skill.

The above-mentioned second condition is a determining condition for determining whether to configure a battle entry skill for the first user, and the second condition may be flexibly configured and adjusted according to actual situations. This is not limited herein.

In some embodiments, the above-mentioned second condition is that the remaining duration is less than or equal to a second value. The second value may be any value greater than 0, such as 15 s, 10 s, 8 s, and 5 s. This is not limited herein. In some embodiments, during the battle entry skill selection phase, the client detects the remaining duration of the battle entry skill selection phase, and then after the remaining duration is less than or equal to the above second value, a first battle entry skill is configured for the first user by the system. The above-mentioned second value may be a value configured by the system, or may be a value customized by the first user. This is not limited herein.

In some embodiments, considering that total durations of battle entry skill selection phases corresponding to the first user in different competitive battles may be different, the above-mentioned second condition is that the proportion of the remaining duration in the total duration of the battle entry skill selection phase is less than or equal to a second required value. In some embodiments, during the battle entry skill selection phase, the remaining duration of the battle entry skill selection phase is detected, and the system configures a first battle entry skill for the first user in a case that the proportion of the remaining duration in the total duration of the battle entry skill selection phase is less than or equal to the second required value. The above-mentioned second required value may be a value configured by the system, or may be a value customized by the first user. This is not limited herein.

In some embodiments, the system may also obtain a division time point corresponding to the battle entry skill selection phase in advance based on the above-mentioned second required value. The division time point is used for separating a battle entry skill selection duration and a battle entry skill allocation duration in the total duration of the battle entry skill selection phase. The battle entry skill allocation duration is a duration during which the system can configure a battle entry skill for the first user, and the battle entry skill selection duration is a duration during which the first user customizes selection of a battle entry skill. In the above-mentioned battle entry skill allocation duration, the user may also customize selection of a battle entry skill. Moreover, in this case, if the client detects a selection operation for a certain battle entry skill by the user, there is no need for the system to configure a first battle entry skill for the first user, the battle entry skill selected by the first user is directly determined as a battle entry skill used by the first user in the competitive battle.

In some embodiments, in order to improve the efficiency of battle entry skill selection, the above-mentioned second condition is that other users before the first user in battle entry skill selection sequence have completed character selection. The other users are users in the same camp as the first user in the competitive battle. The completion of battle entry skill selection means that the users have selected the battle entry skills to use and determined not to actively change the battle entry skills. In some embodiments, during the battle entry skill selection phase, battle entry skill selection of other users are detected. In a case where it is determined that other users before the first user in battle entry skill selection sequence have completed battle entry skill selection, a first battle entry skill is configured by the system for the first user. In some embodiments, the basis for determining the above-mentioned battle entry skill selection sequence is similar to the method for determining the character selection sequence. Details are not described herein again.

In some embodiments, the battle entry skill selection phase and the above-mentioned character selection phase may be the same or different. This is not limited herein.

In some embodiments, the starting times and the ending times of the battle entry skill selection phase and the above-mentioned character selection phase are the same, that is, the two phases are the same time period. In some embodiments, the system selects a first virtual character for the first user in a case that the remaining duration of the character selection phase meets the first condition and the first user does not select a virtual character; and the system selects a first battle entry skill for the first user in a case that the remaining duration of the battle entry skill selection phase meets the second condition and the first user does not select a battle entry skill. The first battle entry skill is any one or more battle entry skills in the above-mentioned at least one battle entry skill.

Figure 7:
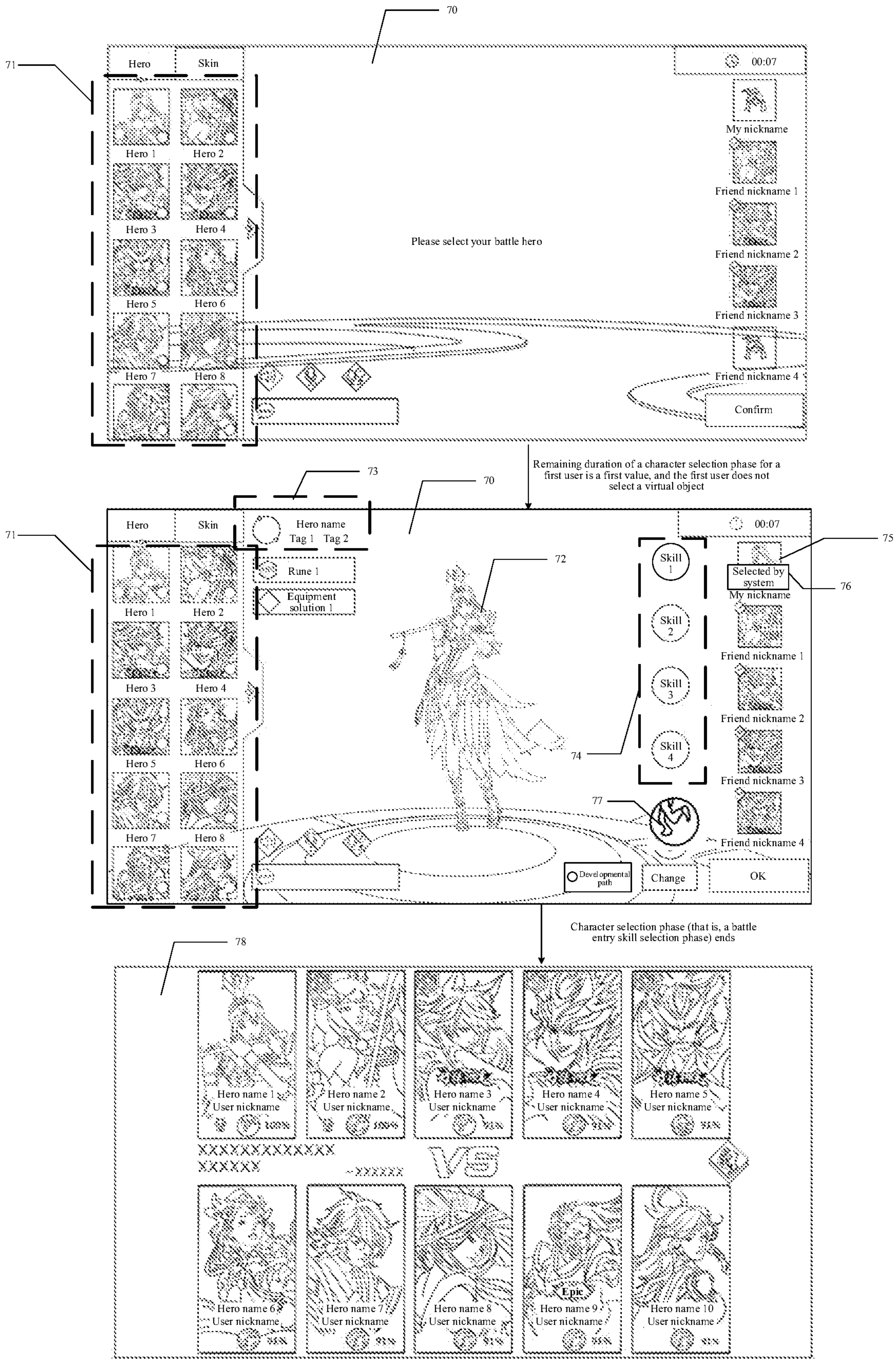
FIG. 7 is a schematic diagram of virtual character and battle entry skill selection modes according to some embodiments.

As shown in FIG. 7, a character selection interface 70 includes options 71 for a plurality of virtual characters. In a case that the remaining duration of the character selection phase for the first user is the first value, and the first user does not select a virtual character, an appearance 72 of a first virtual character, a name 73 of the first virtual character, a skill 74 of the first virtual character, and an avatar 75 of the first virtual character are displayed in the character selection interface 70. Moreover, the character selection interface 70 includes a prompt marker 76 corresponding to the character information of the first virtual character, and the prompt marker 76 includes the words "selected by system". Then, in a case that the remaining duration of the battle entry skill selection phase is the second value, and the first user does not select a battle entry skill, a first battle entry skill 77 selected by the system for the first user is displayed in the character selection interface 70. After the character selection phase (that is, the battle entry skill selection phase) ends, a competitive battle loading interface 78 is displayed.

In some embodiments, the starting times and the ending times of the battle entry skill selection phase and the character selection phase are different. In some embodiments, the system selects a first virtual character for the first user in a case that the remaining duration of the character selection phase meets the first condition and the first user does not select a virtual character; and then, the battle entry skill selection phase is entered after the character selection phase ends, and the system selects a first battle entry skill for the first user in a case that the remaining duration of the battle entry skill selection phase meets the second condition and the first user does not select a battle entry skill.

Figure 8:
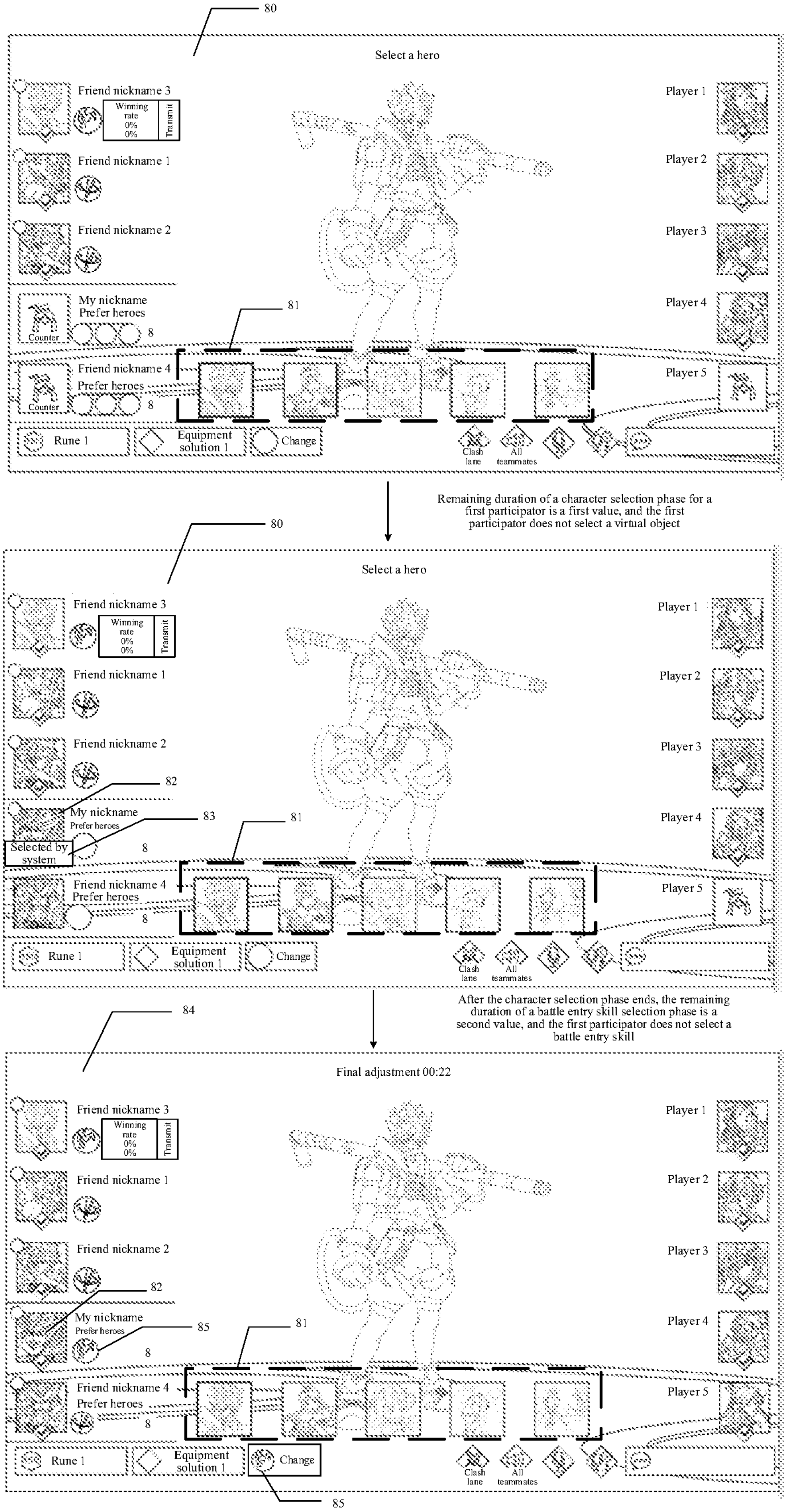
FIG. 8 is a schematic diagram of virtual character and battle entry skill selection modes according to some embodiments.

As shown in FIG. 8, a character selection interface 80 includes options 81 for a plurality of virtual characters. In a case that the remaining duration of the character selection phase for the first user is the first value, and the first user does not select a virtual character, an avatar 82 of a first virtual character is displayed in the character selection interface 80. Moreover, the virtual character selection interface 80 includes a prompt marker 83 corresponding to the character information of the first virtual character, and the prompt marker 83 includes the words "selected by system". Then, after the character selection phase ends, in a case that the remaining duration of the battle entry skill selection phase is the second value, and the first user does not select a battle entry skill, a first battle entry skill 85 selected by the system for the first user is displayed in a battle entry skill selection interface 84.

In some embodiments, the starting times of the battle entry skill selection phase and the character selection phase are the same, but the ending times thereof are different. For example, the ending time of the battle entry skill selection phase is later than the ending time of the character selection phase.

In some embodiments, when obtaining the above-mentioned first battle entry skill, the client determines a first battle entry skill selected by the system for the first user based on second reference information, and then displays skill information of the first battle entry skill in the character selection interface. In some embodiments, the above-mentioned second reference information includes but is not limited to at least one of the following: a type of the first virtual character, skill selection information of the first user, and skill selection information of the competitive battle. The skill selection information of the first user is used for indicating historical skill usages of the first user for the first virtual character, and the skill selection information of the competitive battle is used for indicating historical skill usages of all users for the first virtual character. In some embodiments, the all users are all users having participated in competitive battles provided by the application; or, the all users are users having participated in competitive battles provided by the application, and being similar to the first user; or, the all users are all users participating in the present competitive battle. In this way, rationality of selection of the first battle entry skill can be improved, thereby improving user experience of the first user.

In some embodiments, the above-mentioned second reference information includes the type of the first virtual character. The client determines a function of the first virtual character in the competitive battle according to the type of the first virtual character, and then determines a first battle entry skill of the first virtual character according to the function. In some embodiments, correspondences between functions and battle entry skills may be pre-stored in a configuration table. The client obtains a first battle entry skill corresponding to the above-mentioned function by querying the configuration table.

In some embodiments, the above-mentioned second reference information includes skill selection information of the first user. The client obtains quantities of historical skill usage times of the first virtual character by the first user according to the skill selection information of the first user, and determines a battle entry skill having the highest quantity of historical skill usage times as the first battle entry skill.

In some embodiments, the above-mentioned second reference information includes skill selection information of the competitive battle. The client obtains quantities of historical skill usage times of the first virtual character by a plurality of users according to the skill selection information of the competitive battle, and determines a battle entry skill having the highest quantity of historical skill usage times as the first battle entry skill.

In some embodiments, the client may also select a first battle entry skill for the first user according to any one or more items in the above-mentioned second reference information.

In some embodiments, the system may also select other configuration information for the first user according to the above-mentioned second reference information, such as an appearance and a carried item.

The following describes apparatus of some embodiments, which can be used for executing the method embodiments. For details not disclosed in the apparatus embodiments, refer to the method embodiments.

Figure 9:
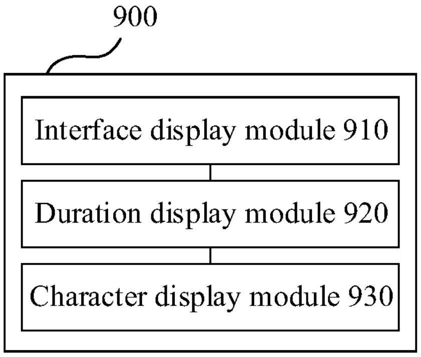
FIG. 9 is a block diagram of a virtual character selection apparatus according to some embodiments.

FIG. 9 is a block diagram of a virtual character selection apparatus according to some embodiments. The apparatus has functions of performing the above-mentioned virtual character selection method, and the functions may be implemented by hardware or may be implemented by hardware executing corresponding software. The apparatus may be a terminal, or may be provided in a terminal. The apparatus 900 may include: an interface display module 910, a duration display module 920, and a character display module 930.

The interface display module 910 is configured to display a character selection interface of a competitive battle. The character selection interface is a user interface used for selecting and displaying a virtual character participating in the competitive battle.

The duration display module 920 is configured to display a remaining duration of a character selection phase.

The character display module 930 is configured to display character information of a first virtual character selected by a system for a first user in the character selection interface in a case that the remaining duration meets a first condition and the first user does not select a virtual character.

In some embodiments, the character display module 930 is configured to:

determine the first virtual character selected by the system for the first user based on first reference information, the first reference information including at least one of the following: character usage information of the first user, and character selection information of the competitive battle, the character usage information of the first user being used for indicating historical usages of virtual characters by the first user, and the character selection information of the competitive battle being used for indicating virtual character selection of a second user participating in the competitive battle other than the first user; and display character information of the first virtual character in the character selection interface.

In some embodiments, a process of selecting the first virtual character based on the first reference information is as follows:

determining at least one candidate virtual character according to the character usage information of the first user; and selecting the first virtual character from the at least one candidate virtual character according to the character selection information of the competitive battle.

In some embodiments, the determining at least one candidate virtual character according to the character usage information of the first user includes at least one of the following:

in a case that the character usage information of the first user includes quantities of historical usage times of the virtual characters by the first user, determining a virtual character having the quantity of historical usage times meeting a first sub-condition as the candidate virtual character;

in a case that the character usage information of the first user includes battle winning rates of the first user for the virtual characters, determining a virtual character having the battle winning rate meeting a second sub-condition as the candidate virtual character;

in a case that the character usage information of the first user includes usage proficiencies of the virtual characters by the first user, determining a virtual character having the usage proficiency meeting a third sub-condition as the candidate virtual character; and in a case that the character usage information of the first user includes latest usage moments of the virtual characters by the first user, determining a virtual character having the latest usage moment meeting a fourth sub-condition as the candidate virtual character.

In some embodiments, the selecting the first virtual character from the at least one candidate virtual character according to the character selection information of the competitive battle includes:

determining a selected virtual character of the second user according to the character selection information of the competitive battle;

obtaining a matching indicator and/or a restraining indicator between each candidate virtual character and the selected virtual character, the matching indicator being used for indicating a cooperation degree between the candidate virtual character and the selected virtual character in the competitive battle, and the restraining indicator being used for indicating a battle threat degree between the candidate virtual character and the selected virtual character in the competitive battle; and determining the first virtual character from the at least one candidate virtual character according to the matching indicator and/or the restraining indicator.

Figure 10:
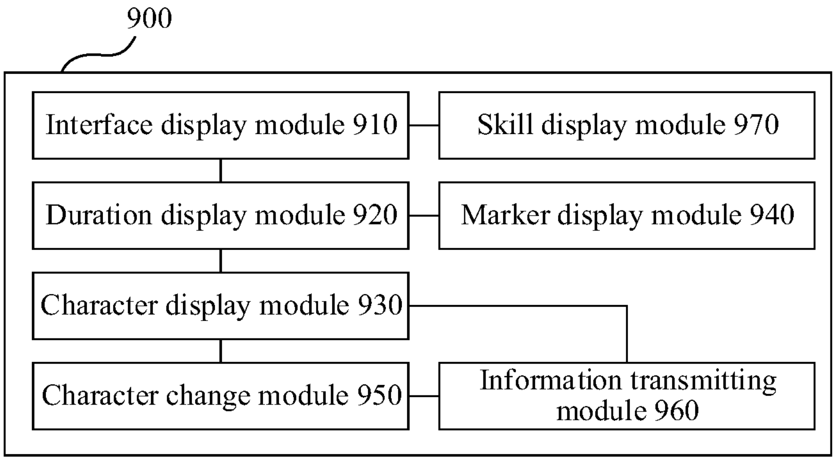
FIG. 10 is a block diagram of a virtual character selection apparatus according to some embodiments.

In some embodiments, as shown in FIG. 10, the apparatus 900 further includes: a marker display module 940.

The marker display module 940 is configured to display a prompt marker corresponding to the character information of the first virtual character in the character selection interface, the prompt marker being used for marking the first virtual character as a virtual character allocated by the system for the first user.

In some embodiments, the first user is allowed to change the first virtual character to another virtual character after the first virtual character is selected by the system; or the first user is not allowed to change the first virtual character to another virtual character after the first virtual character is selected by the system.

In some embodiments, as shown in FIG. 10, the apparatus 900 further includes: a character change module 950 and an information transmitting module 960.

The character change module 950 is configured to change the first virtual character to a second virtual character in response to a change operation on the first virtual character.

The information transmitting module 960 is configured to transmit character change information to a client of the second user, the character change information being used for indicating that the first user changes the first virtual character to the second virtual character. The client of the second user is used for displaying a shortcut switching prompt, and the shortcut switching prompt is used for shortcut switching from a third virtual character selected by the second user to a fourth virtual character.

In some embodiments, as shown in FIG. 10, the apparatus 900 further includes: a skill display module 970.

The skill display module 970 is configured to display skill information of a first battle entry skill selected by the system for the first user in the character selection interface in a case that a remaining duration of a battle entry skill selection phase meets a second condition and the first user does not select a battle entry skill.

In some embodiments, the skill display module 970 is configured to determine the first battle entry skill selected by the system for the first user based on second reference information, the second reference information including at least one of the following: a type of the first virtual character, skill selection information of the first user, and skill selection information of the competitive battle, the skill selection information of the first user being used for indicating historical skill usages of the first user for the first virtual character, and the skill selection information of the competitive battle being used for indicating historical skill usages of all users for the first virtual character; and display the skill information of the first battle entry skill in the character selection interface.

In some embodiments, a client of a second user displays a shortcut switching prompt in the character selection interface after the first virtual character is selected by the system for the first user, the shortcut switching prompt being used for shortcut switching from a third virtual character selected by the second user to a fourth virtual character, and the first user and the second user belonging to a same camp in the competitive battle.

In some embodiments, there is a character selection phase for at least one other user having a starting time and an ending time the same as those of the character selection phase for the first user, the other user and the first user belonging to a same camp in the competitive battle.

In summary, in the technical solutions according to some embodiments, when the remaining duration of the character selection phase meets a first condition and the first user does not select a virtual character, a first virtual character is selected for the first user by the system, and the character information of the first virtual character is displayed in the character selection interface, so that the character selection interface may display the character information of the first virtual character that the user may use in the competitive battle in a case that the first user does not select a virtual character, so as to make it convenient for other users to reasonably arrange a lineup of the competitive battle according to the character information of the first virtual character, thereby improving rationality and reliability of virtual character selection by the other users, and improving user experience in the competitive battle.

According to some embodiments, each module in the apparatus may exist respectively or be combined into one or more units. Certain (or some) units in the units may be further split into multiple smaller function subunits, thereby implementing the same operations without affecting the technical effects of some embodiments. The modules are divided based on logical functions. A function of one module may be realized by multiple units, or functions of multiple modules may be realized by one unit. In some embodiments, the apparatus may further include other units. These functions may also be realized cooperatively by the other units, and may be realized cooperatively by multiple units.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each module and unit are executable by a processor to thereby cause the processor to perform the respective operations of the corresponding module.

Figure 11:
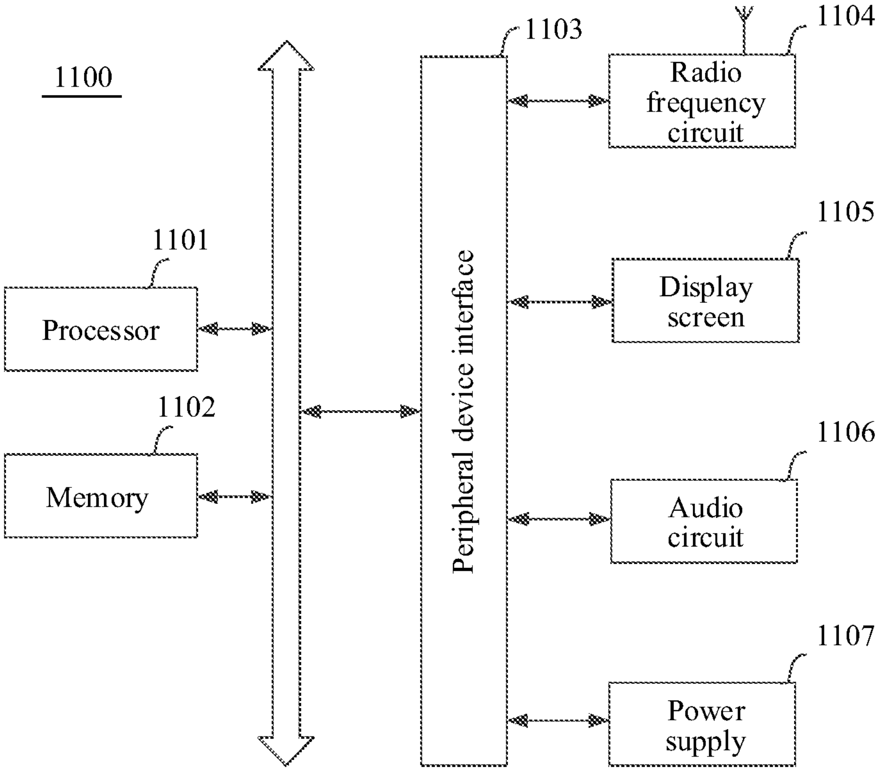
FIG. 11 is a structural block diagram of a terminal according to some embodiments.

FIG. 11 is a structural block diagram of a terminal 1100 according to some embodiments. The terminal 1100 may be an electronic device such as a mobile phone, a tablet computer, a game console, an e-reader, a multimedia playback device, a wearable device, or a PC. The terminal is configured to implement the virtual character selection method according to the above-mentioned embodiments. The terminal may be the terminal 10 of the game running environment shown in FIG. 1. Specifically, the terminal 1100 generally includes: a processor 1101 and a memory 1102.

The processor 1101 may include one or more processing cores, for example, a 4-core processor or an 8-core processor. The processor 1101 may be implemented in at least one hardware form among a Digital Signal Processing (DSP), a Field Programmable Gate Array (FPGA), and a Programmable Logic Array (PLA). The processor 1101 may also include a main processor and a coprocessor. The main processor is a processor configured to process data in a wake-up state, and is also referred to as a Central Processing Unit (CPU). The coprocessor is a low-power consumption processor configured to process data in a standby state. In some embodiments, the processor 1101 may be integrated with a Graphics Processing Unit (CPU). The GPU is configured to render and draw content that needs to be displayed on a display screen. In some embodiments, the processor 1101 may further include an Artificial Intelligence (AI) processor. The AI processor is configured to process computing operations related to machine learning.

The memory 1102 may include one or more computer readable storage media. The computer readable storage media may be non-transient. The memory 1102 may further include a high-speed random access memory and a nonvolatile memory, for example, one or more disk storage devices or flash storage devices. In some embodiments, the non-transient computer readable storage medium in the memory 1102 is configured to store a computer program, and the computer program is configured to be loaded and executed by one or more processors to implement the above-mentioned virtual character selection method.

In some embodiments, the terminal 1100 may further include: a peripheral device interface 1103 and at least one peripheral device. The processor 1101, the memory 1102, and the peripheral device interface 1103 may be connected by a bus or a signal cable. Each peripheral device may be connected to the peripheral device interface 1103 by a bus, a signal cable, or a circuit board. Specifically, the peripheral device includes: at least one of a radio frequency circuit 1104, a display screen 1105, an audio circuit 1106, and a power supply 1107.

A person skilled in the art may understand that the structure shown in FIG. 11 does not constitutes a limitation on the terminal 1100, and the terminal may include more or fewer components than those shown in the drawings, or some components may be combined, or a different component deployment may be used.

In some embodiments, a computer readable storage medium is further provided. The readable storage medium stores a computer program, and the computer program is executed by a processor to implement the above-mentioned virtual character selection method.

In some embodiments, the computer readable storage medium may include: a Read Only Memory (ROM), a Random Access Memory (RAM), a Solid State Drive (SSD), a disc, or the like. The RAM may include a Resistance Random Access Memory (ReRAM) and a Dynamic Random Access Memory (DRAM).

In some embodiments, a computer program product is further provided. The computer program is executed by a processor to implement the above-mentioned virtual character selection method.

The information (including but not limited to subject device information, subject personal information, and the like), data (including but not limited to data used for analysis, stored data, displayed data, and the like), and signals are all authorized by the subject or fully authorized by all parties, and collection, use, and processing of related data need to comply with relevant laws, regulations, and standards of relevant countries and regions. For example, the user accounts, users, and the like are acquired under full authorization.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A virtual character selection method, performed by a terminal, and comprising:

displaying a character selection interface of a competitive battle, the character selection interface being a user interface to select and display a virtual character participating in the competitive battle;

displaying a remaining duration of a character selection phase;

displaying character information of a first virtual character selected by a system for a first user in the character selection interface based on the remaining duration meeting a first condition and the first user not selecting the virtual character; and displaying a prompt marker corresponding to the character information of the first virtual character in the character selection interface, the prompt marker marking the first virtual character as a virtual character allocated by the system for the first user.

2. The method according to claim 1, wherein the first condition is the remaining duration being equal to a non-zero threshold duration.

3. The virtual character selection method according to claim 1, wherein the displaying character information comprises:

determining the first virtual character selected by the system for the first user based on first reference information, the first reference information comprising at least one of character usage information of the first user and character selection information of the competitive battle, the character usage information of the first user indicating historical usages of virtual characters by the first user, and the character selection information of the competitive battle indicating virtual character selection of a second user other than the first user participating in the competitive battle; and displaying the character information of the first virtual character in the character selection interface.

4. The virtual character selection method according to claim 3, wherein a process of selecting the first virtual character based on the first reference information includes:

determining at least one candidate virtual character according to the character usage information of the first user; and selecting the first virtual character from the at least one candidate virtual character according to the character selection information of the competitive battle.

5. The virtual character selection method according to claim 4, wherein the determining at least one candidate virtual character comprises at least one of:

based on the character usage information of the first user comprising quantities of historical usage times of the virtual characters by the first user, determining a virtual character having a quantity of historical usage times meeting a first sub-condition as the candidate virtual character;

based on the character usage information of the first user comprising battle winning rates of the first user for the virtual characters, determining a virtual character having a battle winning rate meeting a second sub-condition as the candidate virtual character;

based on the character usage information of the first user comprising usage proficiencies of the virtual characters by the first user, determining a virtual character having a usage proficiency meeting a third sub-condition as the candidate virtual character; and based on the character usage information of the first user comprising latest usage moments of the virtual characters by the first user, determining a virtual character having a latest usage moment meeting a fourth sub-condition as the candidate virtual character.

6. The virtual character selection method according to claim 4, wherein the selecting the first virtual character from the at least one candidate virtual character comprises:

determining a selected virtual character of the second user according to the character selection information of the competitive battle;

obtaining at least one of a matching indicator or a restraining indicator between each of the at least one candidate virtual character and the selected virtual character, the matching indicator indicating a cooperation degree between the candidate virtual character and the selected virtual character in the competitive battle, and the restraining indicator indicating a battle threat degree between the candidate virtual character and the selected virtual character in the competitive battle; and determining the first virtual character from the at least one candidate virtual character according to the matching indicator or the restraining indicator.

7. The virtual character selection method according to claim 1, wherein the first user is allowed to change the first virtual character to another virtual character after the first virtual character is selected by the system.

8. The virtual character selection method according to claim 1, wherein after the displaying the character information, the virtual character selection method further comprises:

changing the first virtual character to a second virtual character based on a change operation on the first virtual character; and transmitting character change information to a client of a second user, the character change information indicating that the first user changes the first virtual character to the second virtual character, wherein the client of the second user displays a shortcut switching prompt, and the shortcut switching prompt prompts a switch from a third virtual character selected by the second user to a fourth virtual character.

9. The virtual character selection method according to claim 1, further comprising:

displaying skill information of a first battle entry skill selected by the system for the first user in the character selection interface based on a remaining duration of a battle entry skill selection phase meeting a second condition and the first user not selecting a battle entry skill.

10. The virtual character selection method according to claim 9, wherein the displaying the skill information comprises:

determining the first battle entry skill selected by the system for the first user based on second reference information, the second reference information comprising at least one of a type of the first virtual character, skill selection information of the first user, and skill selection information of the competitive battle, the skill selection information of the first user indicating historical skill usages of the first user for the first virtual character, and the skill selection information of the competitive battle indicating historical skill usages of all users for the first virtual character; and displaying the skill information of the first battle entry skill in the character selection interface.

11. A virtual character selection apparatus, comprising:

at least one memory configured to store program code; and at least one processor configured to read the program code and operate as instructed by the program code, the program code comprising:

interface display code configured to cause the at least one processor to display a character selection interface of a competitive battle, the character selection interface being a user interface to select and display a virtual character participating in the competitive battle;

duration display code configured to cause the at least one processor to display a remaining duration of a character selection phase;

character display code configured to cause the at least one processor to display character information of a first virtual character selected by a system for a first user in the character selection interface based on the remaining duration meeting a first condition and the first user not selecting the virtual character; and marker display code configured to cause the at least one processor to display a prompt marker corresponding to the character information of the first virtual character in the character selection interface, the prompt marker marking the first virtual character as a virtual character allocated by the system for the first user.

12. The virtual character selection apparatus according to claim 11, wherein the character display code is further configured to cause the at least one processor to:

determine the first virtual character selected by the system for the first user based on first reference information, the first reference information comprising at least one of character usage information of the first user and character selection information of the competitive battle, the character usage information of the first user indicating historical usages of virtual characters by the first user, and the character selection information of the competitive battle indicating virtual character selection of a second user other than the first user participating in the competitive battle; and display the character information of the first virtual character in the character selection interface.

13. The virtual character selection apparatus according to claim 12, wherein a process of selecting the first virtual character based on the first reference information includes:

determining at least one candidate virtual character according to the character usage information of the first user; and selecting the first virtual character from the at least one candidate virtual character according to the character selection information of the competitive battle.

14. The virtual character selection apparatus according to claim 13, wherein the character display code is further configured to cause the at least one processor to perform at least one of:

based on the character usage information of the first user comprising quantities of historical usage times of the virtual characters by the first user, determine a virtual character having a quantity of historical usage times meeting a first sub-condition as the candidate virtual character;

based on the character usage information of the first user comprising battle winning rates of the first user for the virtual characters, determine a virtual character having a battle winning rate meeting a second sub-condition as the candidate virtual character;

based on the character usage information of the first user comprising usage proficiencies of the virtual characters by the first user, determine a virtual character having a usage proficiency meeting a third sub-condition as the candidate virtual character; and based on the character usage information of the first user comprising latest usage moments of the virtual characters by the first user, determine a virtual character having a latest usage moment meeting a fourth sub-condition as the candidate virtual character.

15. The virtual character selection apparatus according to claim 13, wherein the selecting the first virtual character from the at least one candidate virtual character comprises:

determining a selected virtual character of the second user according to the character selection information of the competitive battle;

obtaining at least one of a matching indicator or a restraining indicator between each of the at least one candidate virtual character and the selected virtual character, the matching indicator indicating a cooperation degree between the candidate virtual character and the selected virtual character in the competitive battle, and the restraining indicator indicating a battle threat degree between the candidate virtual character and the selected virtual character in the competitive battle; and determining the first virtual character from the at least one candidate virtual character according to the matching indicator or the restraining indicator.

16. The virtual character selection apparatus according to claim 11, wherein the program code further comprises:

character change code configured to cause the at least one processor to change the first virtual character to a second virtual character based on a change operation on the first virtual character; and information transmitting code configured to cause the at least one processor to transmit character change information to a client of a second user, the character change information indicating that the first user changes the first virtual character to the second virtual character, wherein the client of the second user displays a shortcut switching prompt, and the shortcut switching prompt prompts a switch from a third virtual character selected by the second user to a fourth virtual character.

17. The virtual character selection apparatus according to claim 11, wherein the program code further comprises:

skill display code configured to cause the at least one processor to display skill information of a first battle entry skill selected by the system for the first user in the character selection interface based on a remaining duration of a battle entry skill selection phase meeting a second condition and the first user not selecting a battle entry skill.

18. A non-transitory computer-readable storage medium storing computer code that when executed by at least one processor causes the at least one processor to at least:

display a character selection interface of a competitive battle, the character selection interface being a user interface to select and display a virtual character participating in the competitive battle;

display a remaining duration of a character selection phase;

display character information of a first virtual character selected by a system for a first user in the character selection interface based on the remaining duration meeting a first condition and the first user not selecting the virtual character; and display a prompt marker corresponding to the character information of the first virtual character in the character selection interface, the prompt marker marking the first virtual character as a virtual character allocated by the system for the first user.

* * * * *